(12) United States Patent
Takemoto et al.

(10) Patent No.: US 9,893,624 B2
(45) Date of Patent: Feb. 13, 2018

(54) POWER SUPPLY UNIT HAVING HEAT DISSIPATION STRUCTURE

(71) Applicant: DENSO CORPORATION, Kariya, Aichi-pref. (JP)

(72) Inventors: Yuuki Takemoto, Kariya (JP); Yuuichi Handa, Anjo (JP); Katsutoyo Misawa, Kariya (JP); Syotarou Yamasaki, Kariya (JP); Syuji Kurauchi, Nagoya (JP); Kenta Hatakenaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/530,094

(22) Filed: Oct. 31, 2014

(65) Prior Publication Data

US 2015/0123645 A1 May 7, 2015

(30) Foreign Application Priority Data

Nov. 1, 2013 (JP) ................................. 2013-228362
Apr. 23, 2014 (JP) ................................. 2014-088982

(51) Int. Cl.
*H02M 3/145* (2006.01)
*H02M 3/28* (2006.01)
(Continued)

(52) U.S. Cl.
CPC .............. *H02M 3/28* (2013.01); *H01F 27/08* (2013.01); *H01F 27/36* (2013.01); *H02M 7/003* (2013.01)

(58) Field of Classification Search
CPC .... H02M 3/00; H02M 7/003; H02M 3/33523; H02M 3/33592; H02M 3/28; G06F 1/26;
(Continued)

(56) References Cited

U.S. PATENT DOCUMENTS 6,466,454 B1 * 10/2002 Jitaru ...................... H01F 27/06
336/200
2005/0052888 A1 * 3/2005 Takeshima ............ H02M 7/003
363/147

(Continued)

FOREIGN PATENT DOCUMENTS

JP     2000-324839    11/2000
JP     4924797         2/2012

*Primary Examiner* — James Wu
*Assistant Examiner* — Michael Matey
(74) *Attorney, Agent, or Firm* — Nixon & Vanderhye P.C.

(57) ABSTRACT

A power supply unit includes: a transformer; a primary component that constitutes a primary circuit connected to the transformer; a secondary component that constitutes a secondary circuit connected to the transformer; a choke coil; a base plate including the transformer, the primary component, the secondary component and the choke coil; a metal plate connected to the base plate; and a connecting member connecting the primary component and the transformer. The primary component and the transformer are laminated to constitute a first laminating body. A part of the metal plate is disposed closer to the transformer than the primary component, and the metal plate and the transformer are electrically connected by a ground line. A connection point between the ground line and the metal plate is located closer to the transformer than the primary component.

11 Claims, 6 Drawing Sheets

(51) Int. Cl.
*H01F 27/08* (2006.01)
*H02M 7/00* (2006.01)
*H01F 27/36* (2006.01)

(58) Field of Classification Search
CPC ....... H01F 2027/2819; H01F 2038/026; H01F 27/36; H05K 1/0262
See application file for complete search history.

(56) References Cited

U.S. PATENT DOCUMENTS

| | | | |
|---|---|---|---|
| 2005/0270806 A1* | 12/2005 | Zhu | H02M 3/33576 363/17 |
| 2012/0020025 A1* | 1/2012 | Sotome | H01G 2/08 361/704 |
| 2014/0169042 A1* | 6/2014 | Eguchi | H02M 3/3353 363/21.06 |
| 2014/0306791 A1* | 10/2014 | Kanazawa | H01F 27/06 336/199 |

* cited by examiner

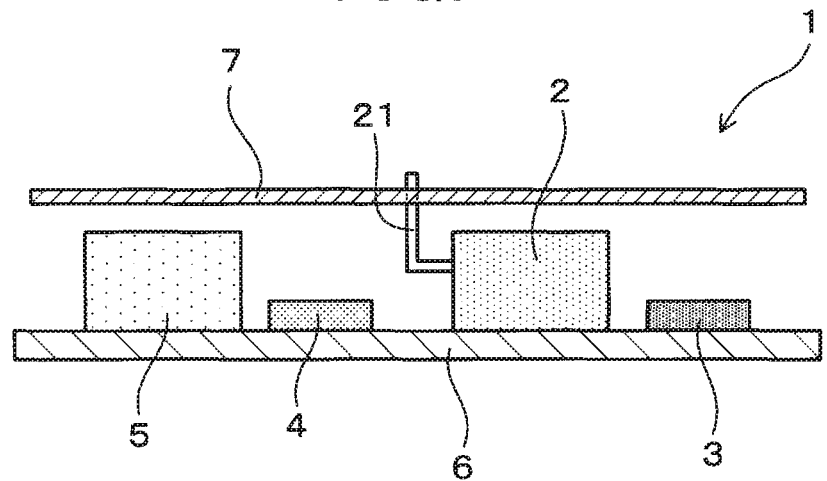
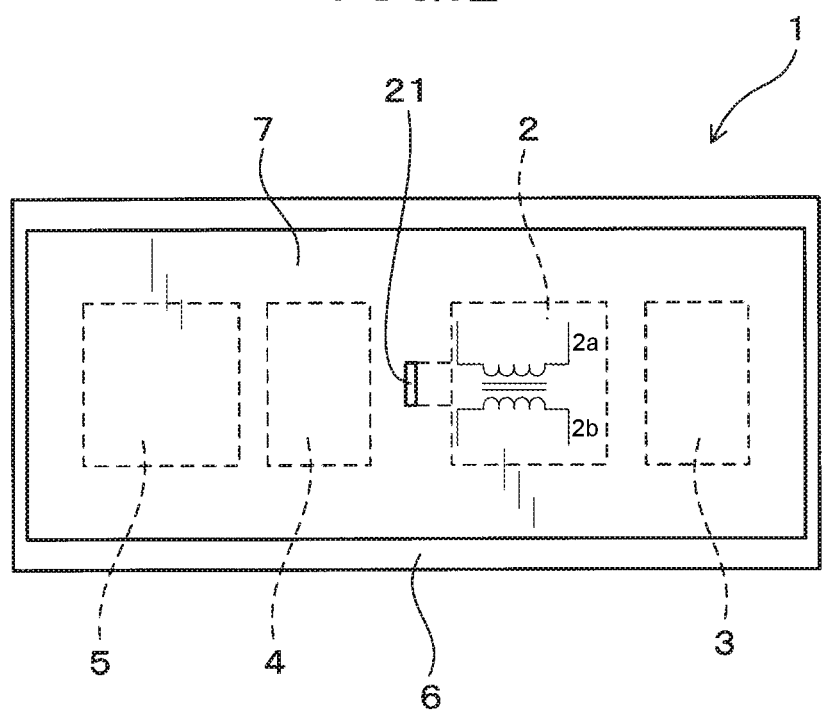

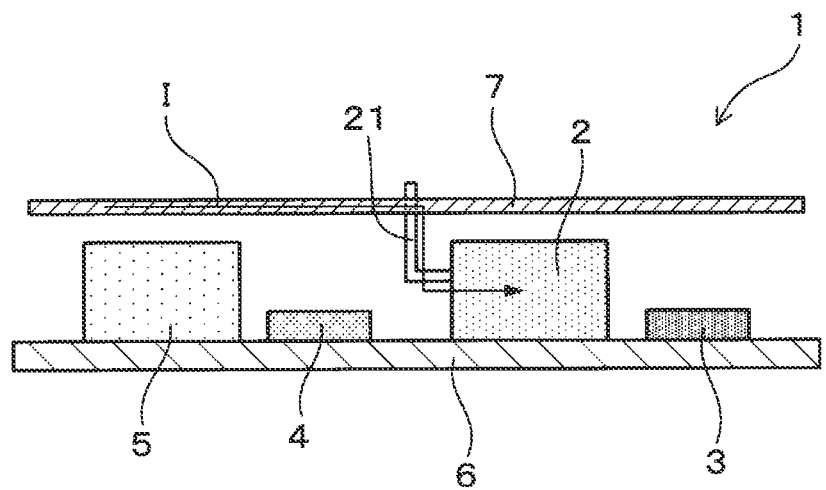
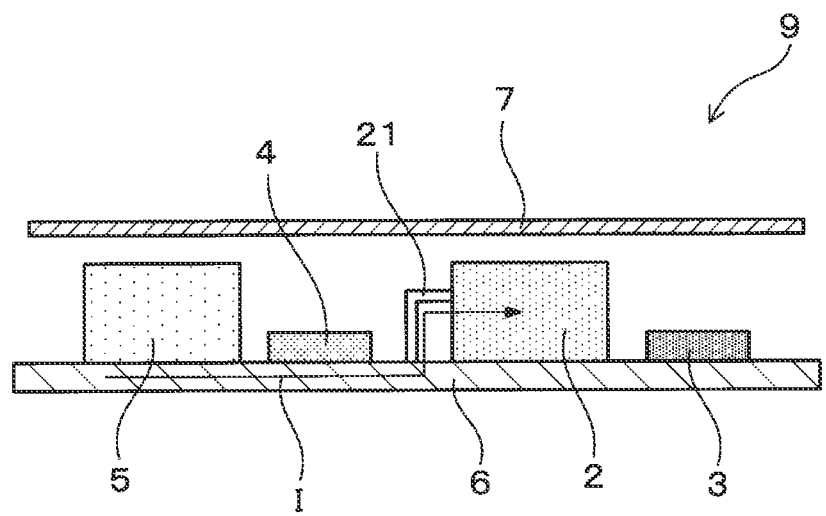

POWER SUPPLY UNIT HAVING HEAT DISSIPATION STRUCTURE

CROSS-REFERENCE TO RELATED APPLICATION

This application is based on and claims the benefit of priority from earlier Japanese Patent Application Nos. 2013-228362 filed Nov. 1, 2013 and 2014-88982 filed on Apr. 23, 2014, the description of which is incorporated herein by reference.

BACKGROUND

Technical Field

The present disclosure relates to a power supply unit having a transformer.

Description of the Related Art

Generally, a power supply unit, such as a DC-DC converter, includes various electrical components, e.g. transformer, choke coil and others. These electrical components produce heat so that radiating heat produced thereby would be a problem when the power supply unit is shrunk or the power supply unit requires supplying large amount of current. For example, Japanese Patent No. 4924797 discloses a power supply unit in which a conductor of the secondary coil allowing a large amount of current to flow is fixed to a metal substrate fixed on a base plate. Hence, the power supply unit according to the above-described patent document achieves heat dissipation, that is, a heat produced by the secondary coil having relatively large heating value is effectively transmitted to the base plate via the metal substrate.

However, in the power supply unit according to the above-described patent document, an electrical component such as a rectifier is mounted in the vicinity of a connecting portion of the conductor at the secondary coil fixed to the metal substrate. Hence, in the vicinity of the connecting portion of the secondary coil, the temperature of the base plate and the metal-made plate are likely to increase so that it is difficult to radiate the heat produced at the secondary coil effectively. Similarly, heat dissipation from electrical components disposed near the same area is difficult to carry out.

Further, when the conductor of the secondary coil is connected to the base plate, the base plate itself produces heat due to current flowing in the base plate. As a result, it is difficult to radiate heat produced at the electrical components such as transformer or rectifiers.

Furthermore, electro-magnetic noise emitted from the transformer and the choke coil can be shielded in a base plate side. However, regarding the opposite side of the base plate, electro-magnetic noise is leaked externally if a shield plate is not provided so that the electro-magnetic noise is likely to influence the peripheral equipment. The electrical components that constitute the power supply unit are arranged on the base plate towards a direction where the base plate spreads. Therefore, the base plate becomes larger in the surface direction whereby the size of the power supply unit is likely to become larger.

SUMMARY

An embodiment provides a power supply unit having excellent heat dissipation structure and being capable of shrinking the size thereof.

As a first aspect of the embodiment, the power supply unit includes: a transformer having a primary coil and a secondary coil; a primary component that constitutes a primary circuit connected to a primary coil of the transformer; a secondary component that constitutes a secondary circuit connected to a secondary coil of the transformer; a choke coil that constitutes a smoothing circuit used to smooth the output voltage thereof; a base plate provided with the transformer, the primary component, the secondary component and the choke coil on a surface thereof, the base plate being connected to a ground; a metal plate electrically connected to the base plate; and a connecting member that electrically connects the primary component and the transformer. The primary component and the transformer are laminated in a normal direction of the base plate such that the primary component is disposed at a base plate side, thereby constituting a first laminating body. At least a part of the metal plate is disposed closer to the transformer than to the primary component, and the metal plate and the transformer are electrically connected by a ground line, and a connection point between the ground line and the metal plate is located closer to the transformer than to the primary component.

In the above-described power supply unit, the ground line of the transformer is connected to the metal plate which is apart from the base plate. Hence, heat produced at the transformer can be radiated to the metal plate which is different from the base plate. Accordingly, heat produced by the secondary coil can be radiated through a heat-radiation path which is different from a heat-radiation path of the other electrical components such as the primary semiconductor component, the secondary semiconductor component and the choke coil. As a result, heat dissipation of the transformer can be effectively carried out and also, heat dissipation from the other electrical components can be effectively carried out at the same time. In other words, heat radiation paths of a plurality of electrical components including the transformer can be distributed to plural heat radiation paths, whereby heat dissipation as a whole power supply unit can be effectively achieved.

Moreover, since it is not necessary that the ground line of the transformer is connected to the base plate, current flowing through the secondary coil (secondary current) can be avoided from also flowing through the base plate. Accordingly, heat produced at the base plate due to the current flowing therethrough can be avoided. As a result, an increase of the temperature at the base plate is suppressed, whereby cooling the electrical components mounted on the base plate can effectively carried out.

The primary semiconductor component and the transformer are laminated so as to form the first laminating body. Therefore, space for mounting the primary semiconductor component and the transformer can be shrunk in a direction parallel to the mounting surface of the base plate. Hence, the base plate can be shrunk and further, the power supply unit can be shrunk as well.

Moreover, the ground line is connected to the metal plate at a side of the transformer rather than a side of the primary semiconductor component. Therefore, a connecting portion between the ground line and the metal plate and the connecting member can be disposed apart from each other. Hence, the metal plate and the ground line can readily be connected without being influenced by the connecting member.

As described, according to the present disclosure, a power supply unit having excellent heat radiation structure and being capable of shrinking the size thereof can be provided.

BRIEF DESCRIPTION OF THE DRAWINGS

In the accompanying drawings:

FIG. 1 is an explanatory diagram showing a cross section of the power supply unit according to a reference example 1 of the present disclosure;

FIG. 2 is an explanatory diagram showing a planar view of the power supply unit according to the reference example 1;

FIG. 3 is an explanatory diagram showing a cross section of the power supply unit according to the reference example 1, in which secondary current flowing into the metal plate is explained;

FIG. 4 is an explanatory diagram showing a cross section of the power supply unit according to the comparative example, in which secondary current flowing into the metal plate is explained;

DETAILED DESCRIPTION OF THE PREFERRED EMBODIMENTS

Figure 5:
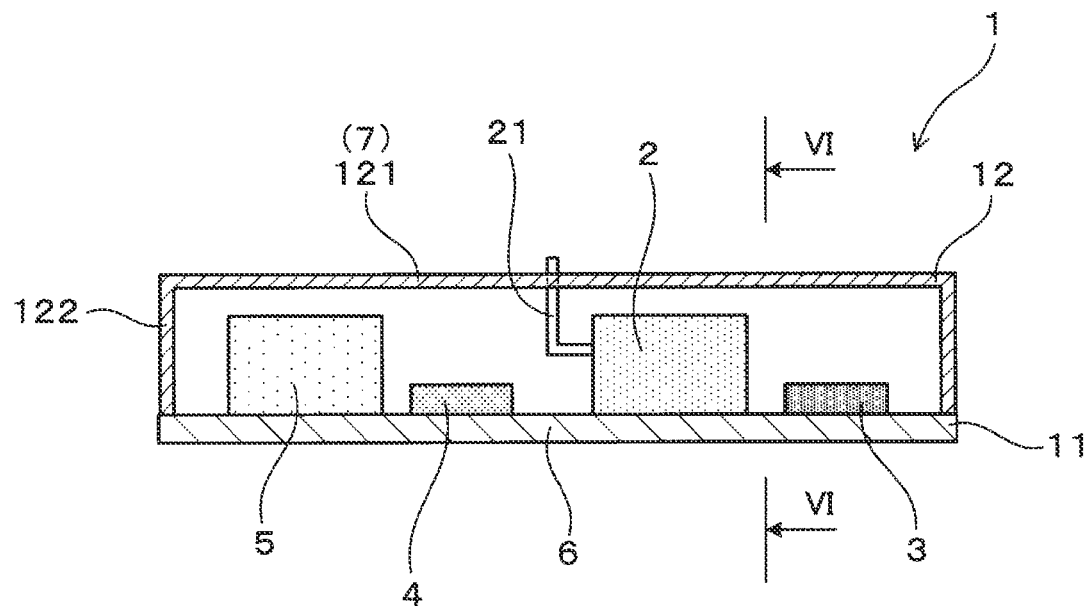
FIG. 5 is an explanatory diagram showing a cross section of the power supply unit according to the reference example 2.

The above-described power supply unit can be configured as a DC-DC converter in which high voltage DC power of the DC (direct current) power supply is stepped down to a low voltage DC power. Also, the above-described power supply unit can be mounted to, for example, an electric vehicle or a hybrid vehicle.

Moreover, the above-described metal plate together with the above-described base plate can be configured as a part of cover member that constitutes a housing of the power supply unit. In this case, the metal plate is not necessarily disposed inside the housing. Therefore, the number of components can be reduced, weight of the power supply unit can be saved and the size thereof can readily be reduced as well.

When viewing from the normal direction of the base plate, the power supply unit is preferably designed such that the contour of the above-described primary component is larger than that of the above-described transformer and at least a part of the above-described ground line is disposed at an inner area of the contour of the above-described primary component when viewing from the normal direction. In this case, the above-described first laminating body is constituted such that the above-described primary component having large contour when viewing from the normal direction and the above-described transformer are laminated. Therefore, a space adjacent towards a direction perpendicular to a laminating direction with respect to the transformer is regarded as a dead space. In the above-described power supply unit, the above-described ground line is disposed in the space formed around the first laminating body, thereby effectively utilizing the space around the first laminating body. As a result, the above-described power supply unit can be shrunk.

Embodiment

Reference Example 1

With reference to FIG. 1 to FIG. 2, the embodiment of the above-described power supply unit is described as follows.

The power supply unit 1 as shown in FIGS. 1 to 2 is provided with a transformer 2 having a primary coil and a secondary coil, a primary semiconductor component 3 (i.e., primary component) that constitutes a primary circuit connected to a primary coil 2a of the transformer 2, a secondary semiconductor component 4 (i.e., secondary component) that constitutes a secondary circuit connected to the secondary coil 2b of the transformer 2 and a choke coil 5 that constitutes a smoothing circuit used to smooth the output voltage thereof.

The power supply circuit 1 includes a plate 7 that covers the transformer 2, the primary semiconductor component 3, the secondary semiconductor component 4, a base plate 6 on which the choke coil is mounted and at least the transformer 2 or the choke coil 5. The metal plate 7 covers these components from the opposite side of the base plate 6. Also, a ground line 21 being led from the secondary coil is connected to the meal plate 7.

In the embodiment, the power supply unit 1 serves as a DC-DC converter and is mounted on, for example, an electric vehicle or a hybrid vehicle. The power supply unit 1 steps down high voltage DC power of the DC power source into low voltage DC power which is supplied to a battery for auxiliary equipment.

The primary circuit constitutes a switching circuit and the primary semiconductor component 3 is constituted by a semiconductor module that integrates a plurality of switching elements. As a switching element, for example, an IGBT (Insulated Gate Bipolar Transistor) or MOSFET (metal oxide semiconductor field effect transistor) can be used. It is noted that the primary semiconductor component is not necessarily a semiconductor module, for example, a discrete semiconductor component can be used instead.

The secondary circuit constitutes a rectifier and the secondary semiconductor component 4 is constituted by a diode module integrating a plurality of diodes. However, the secondary semiconductor component 4 may be a semiconductor module that integrates a plurality of MOSFETs. Moreover, the secondary semiconductor component may be a discrete semiconductor component.

The smoothing circuit is constituted by a choke coil 5 and a capacitor (not shown). The DC power transmitted to the power supply unit 1 according to the reference example 1 is converted to AC power by the primary circuit (i.e., switching circuit) and transmitted to the transformer 2. The transmitted AC power is stepped down by the transformer 2 and rectified by the secondary circuit (rectifier) then, DC power is obtained. The DC power after stepping down is smoothed by the smoothing circuit and outputted therefrom.

In the reference example 1, the transformer 2, the primary semiconductor component 4 and the choke coil 5 are arranged on the base plate 6 such that these components are disposed along a direction to which its mounting surface is spread (i.e., as shown FIG. 2 and FIG. 3, these components are arranged in series along the longitudinal direction of the mounting surface). Heat produced by the primary semiconductor component 3, the secondary semiconductor component 4 and the choke coil 5 is mostly radiated via the base plate 6. It is noted that the base plate 6 can be constituted by a metal such as aluminum.

The metal plate 7 is disposed in parallel to the base plate 6 so as to cover, from the opposite side of the base plate 6, the transformer 2, the primary semiconductor component 3, the secondary semiconductor component 4 and the choke coil 5. The metal plate 7 can be made of materials such as stainless steel, cold-forged steel plate and copper. The metal plate 7 is electrically connected to the ground.

The ground line 21 of the secondary coil of the transformer 2 is pulled out from the transformer 2 to be in parallel to the base plate 6 and the metal plate 7 and is bent towards the metal plate 7, whereby the ground line 21 is connected to the metal plate 7. According to the reference example 1, the ground line 21 penetrates a through hole formed on the metal plate 7 to be fixed with the metal plate 7.

In the reference example 1, the primary semiconductor component 3, the transformer 2, the secondary semiconductor component 4 and the choke coil 5 are arranged in this order to be in parallel on the mounting surface of the base plate 6. The ground line 21 is pulled out from the transformer 2 towards the secondary semiconductor component 4 along the direction to which the above-described components are arranged. Then, the ground line 21 is connected to the metal plate 7 at a portion between the transformer 2 and the secondary semiconductor component 4 when viewing from the normal direction of the base plate 6. The secondary coil includes terminals other than the ground line 21, however, the terminals are connected to the secondary semiconductor component 4 (illustration is omitted).

Next, effects and advantages of the reference example 1 are described as follows. In the above-described power supply unit 1, the ground line 21 of the secondary coil is connected to the metal plate 7 which is apart from the base plate 6. Hence, most of the heat produced by the secondary coil can be radiated via the metal plate 7 which is different from the base plate 6. Accordingly, heat produced by the secondary coil can be radiated through a heat-radiation path which is different from a heat-radiation path of the other electrical components such as the primary semiconductor component 3, the secondary semiconductor component 4 and the choke coil 5. As a result, heat dissipation of the secondary coil can be effectively carried out and also, heat dissipation of the other electrical components can be effectively carried out at the same time. In other words, heat radiation paths of a plurality of electrical components including the transformer 2 can be distributed to plural heat radiation paths, whereby heat dissipation as a whole power supply unit 1 can be effectively achieved.

Moreover, since the ground line 21 of the secondary coil is not connected to the base plate 6, the secondary current can be avoided from flowing through the base plate 6 (described later in the comparative example). Specifically, as shown in FIG. 3, in the reference example 1, the secondary current I flows through the metal plate 7 and does not flow through the base plate 6. Hence, the base plate 6 can avoid producing heat due to secondary current. As a result, an increase of the temperature of the base plate 6 is suppressed so that heat dissipation of the electrical components mounted on the base plate 6 can be effectively radiated.

Moreover, the metal plate 7 covers the transformer 2 and the choke coil 5 from the opposite side of the base plate 6. Accordingly, electro-magnetic noise emitted from the transformer 2 and the choke coil 5 can be shielded from the opposite side of the base plate 6 so that the radiation noise can be reduced.

Also, as described above, the metal plate 7 serves as a heat-radiation path of the secondary coil and serves as a member to shield electro-magnetic noise so that the number of components used in the power supply unit 1 can be reduced. Therefore, the power supply unit 1 can be shrunk effectively.

According to the above-described reference example 1, the power supply unit has excellent heat dissipation characteristics and further, the power supply unit can reduce radiation noise.

Comparative Example

This comparative example is an example of a power supply unit 9 in which the ground line 21 of the secondary coil of the transformer 2 is connected to the base plate 6. Other configurations in this example are the same as the one of the reference example 1. It is noted that reference symbols identical to the one used in the reference example 1 among the reference symbols used in this comparative example or the drawings of this comparative example represents the same element of the reference example 1 unless otherwise indicated.

In the comparative example, heat produced by the secondary coil is radiated to the base plate 6 through the ground line 21. However, since electrical components such as secondary semiconductor component 4 radiates heat to the base plate 6 as well, the temperature at the base plate 6 is likely to increase. As a result, heat dissipation of the secondary coil is difficult to achieve. Moreover, the temperature at the base plate 6 is increased by heat of the secondary coil whereby the heat produced in the electrical components such as the secondary semiconductor component is difficult to effectively dissipate.

Further, in this comparative example, secondary current I flowing through the secondary coil flows through the base plate 6 as well, whereby the base plate 6 produces heat. Hence, the temperature of the base plate 6 increases so that heat produced at electrical components such as secondary semiconductor component 4 mounted thereon is difficult to dissipate to the base plate 6. Accordingly, as a whole power supply unit 9, it is difficult to improve the efficiency of the heat dissipation.

In contrast, in the power supply unit 1 (as shown in FIGS. 1 to 3) according to the reference example 1, as described above, since the ground line 21 is connected to the metal plate 7 not to the base plate 6, the above-described problem no longer exists. Hence, as a whole power supply unit 1, efficiency of the heat dissipation can be significantly improved.

Reference Example 2

Figure 6:
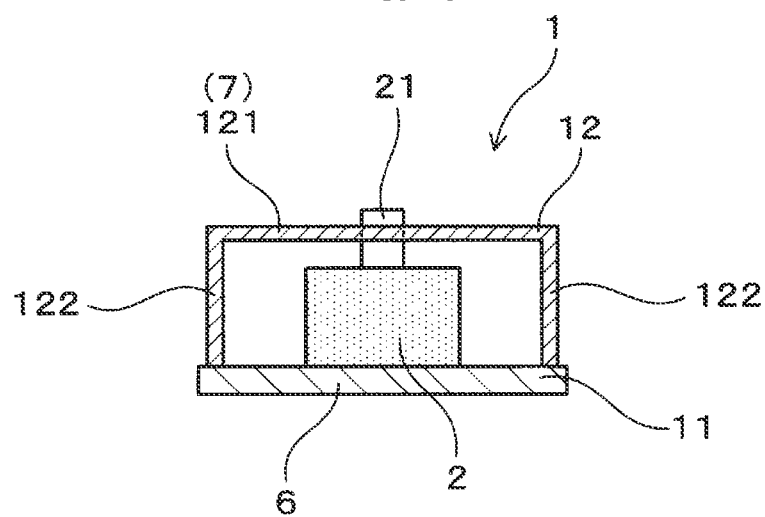
FIG. 6 is a diagram showing a cross sectional view taken along the line VI-VI of FIG. 5.

As shown in FIGS. 5 and 6, according to the reference example 2, the metal plate 7 is configured as at least a part of a cover member 12 that constitutes a housing 11 of the power supply unit 1. In this reference example 2, the base plate 6 is configured as a part of the cover member 12 together with the base plate 6. The power supply unit 1 includes electrical components such as transformer 2, primary semiconductor component 3, secondary semiconductor component 4 and a choke coil 5 which are arranged in the housing 11. The base plate 6 constitutes a part of the housing 11. The housing 11 is constituted by combining the base plate 6 and the cover member 12. In this reference example 2, the cover member 12 is provided with a ceiling plate member 121 that faces the base plate 6 and a side plate member 122 extending to the base plate 6 from an edge of the ceiling plate. In this case, the ceiling plate member 121 is configured by the above-described metal plate 7 and serves the same function of the metal plate 7 described in the reference example 1. The cover member 12 is an integrated member including the side plate member 122, which is made of metal.

It is not limited to the structure of the reference example 2, however, a portion corresponding to the side plate member 122 can be configured by a part of the base plate 6. The other configurations in the reference example 2 are the same as the one of the reference example 1. It is noted that the reference symbols identical to the one used in the reference example 1 among the symbols used in this reference example 2 or the drawings thereof represents similar elements of the reference example 1 unless otherwise indicated.

In this reference example 2, the metal plate 7 is not necessarily disposed in the housing 11. Hence, the number of components can be reduced and, weight-saving and shrinking of the power supply unit can readily be accomplished. Moreover, the reference example 2 has effects and advantages similar to the reference example 1.

Reference Example 3

Figure 7:
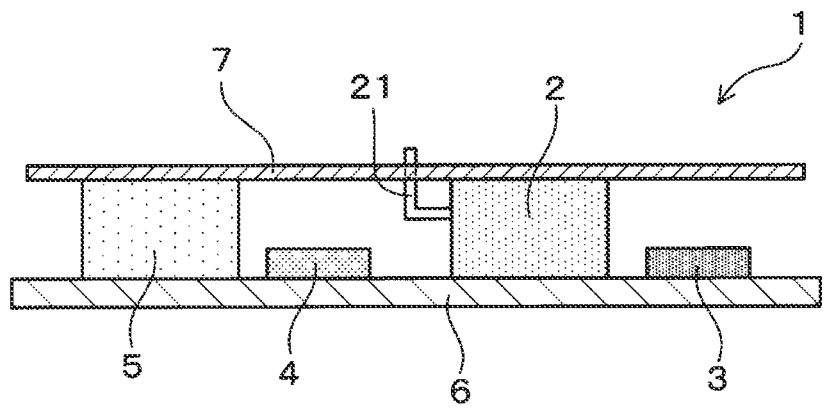
FIG. 7 is an explanatory diagram showing a cross sectional view of the power supply unit according to the reference example 3.

In this example, as shown in FIG. 7, the metal plate 7 holds at least either the transformer 2 or the choke coil 5 to be fixed between the metal plate 7 and the base plate 6. In other words, the metal plate 7 holds down a surface opposite to the base plate 6 of the transformer 2 and the choke coil 5 which are mounted on the base plate 6. The metal plate 7 contacts with surfaces of the transformer 2 and a core of the choke coil 5. The other configurations in the reference example 3 are the same as the one of the reference example 1. It is noted that the reference symbols identical to the one used in the reference example 1 among the symbols used in this reference example 3 or the drawings thereof represents similar elements of the reference example 1 unless otherwise indicated.

In this example, as another function of the metal plate 7, the metal plate 7 has a function that fixes the transformer 2 and the choke coil 5. Accordingly, it is not necessary to prepare fixing means that fixes the transformer 2 and the choke coil 5 so that the number of components of the power supply unit can be reduced. Further, since the metal plate 7 contacts with the transformer 2 and the core of the choke coil 5, heat produced by the transformer 2 and the choke coil 5 can be radiated to the metal plate 7 via the core of the choke coil 5. The reference example 3 has effects and advantages similar to the reference example 1.

According to the reference example 3, it is exemplified that the metal plate 7 holds both the transformer 2 and the choke coil 5 between the metal plate 7 and the base plate 6. However, a configuration in which the metal plate 7 together with the base plate 6 sandwiches either the transformer 2 or the choke coil 5, to be fixed therebetween can be employed as well.

First Embodiment

Figure 8:
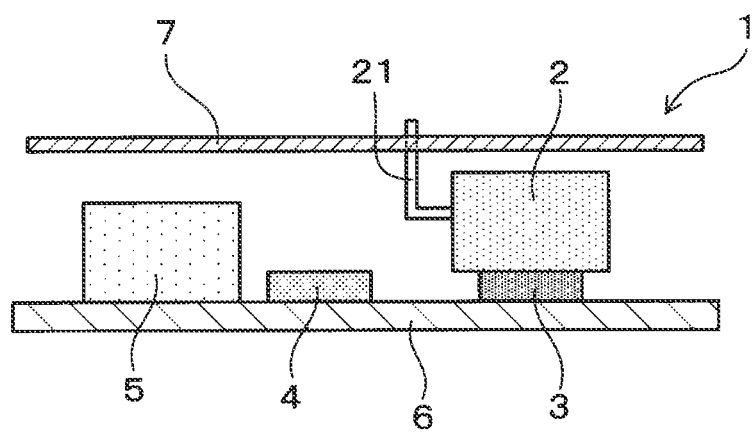
FIG. 8 is an explanatory diagram showing a cross sectional view of the power supply unit according to the first embodiment.

In the first embodiment, as shown in FIG. 8, it is exemplified that at least either the primary semiconductor component 3 or the secondary semiconductor component 4 and at least either transformer 2 or the choke coil 5 are laminated in the normal direction of the base plate 6. According to the first embodiment, the transformer 2 and the primary semiconductor component 3 are laminated in the normal direction of the base plate 6. In the laminating structure, the primary semiconductor component 3 is disposed facing the surface of the base plate 6 (i.e., base plate side) and the transformer 2 is disposed facing the metal plate 7 (i.e., metal plate side). The other configurations in the first embodiment are the same as the one of the reference example 1. It is noted that the reference symbols identical to the one used in the reference example 1 among the symbols used in the first embodiment or the drawings thereof represents similar elements of the reference example 1 unless otherwise indicated.

According to the first embodiment, the area of the mounting surface of the base plate 6 can be smaller so that the power supply unit 1 can be shrunk in a direction where the mounting surface is spread. It is noted that the first embodiment has effects and advantages similar to the reference example 1.

In the first embodiment, it is exemplified that the primary semiconductor component 3 is disposed on the base plate side. However, the transformer 2 can be disposed on the base plate side. Moreover, according to the first embodiment, the transformer 2 and the primary semiconductor component 3 are laminated in the normal direction of the base plate 6, however, the choke coil 5 and the secondary semiconductor component 4 can be laminated in the normal direction. Alternatively, the transformer 2 and the secondary semiconductor component 4 can be laminated or the choke coil 5 and the primary semiconductor component 3 can be laminated as well.

Second Embodiment

Figure 9:
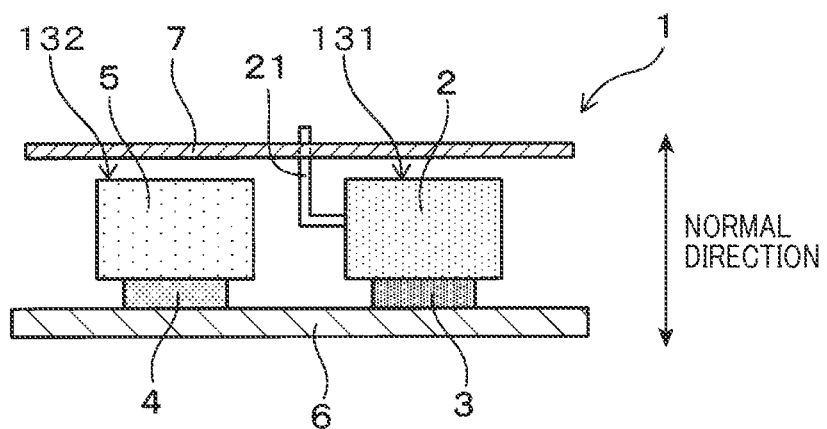
FIG. 9 is an explanatory diagram showing a cross sectional view of the power supply unit according to the second embodiment.

In the second embodiment, as shown in FIG. 9, it is exemplified that the primary semiconductor component 3 and the transformer 2 are laminated in the normal direction of the base plate 6 so as to constitute a first laminating body 131 and, the secondary semiconductor component 4 and the choke coil 5 are laminated in the normal direction of the base plate 6 so as to constitute a second laminating body 132. Further, as shown in FIG. 9, the ground line 21 is disposed between the first laminating body 131 and the second laminating body 132.

Regarding the first laminating body 131, the primary semiconductor component 3 is disposed on the base plate side and the transformer 2 is disposed at the metal plate side. In the second laminating body 132, the secondary semiconductor component 4 is disposed on the base plate side and the choke coil 5 is disposed at a side of the metal plate side.

The ground line 21 of secondary coil in the transformer 2 is extended from the transformer 2 to a side of the second laminating body. The ground line 21 is bent to be connected to the metal plate 7. The other configurations in the second embodiment are the same as the one of the reference example 1. It is noted that the reference symbols identical to the one used in the reference example 1 among the symbols used in the second embodiment or the drawings thereof represent similar elements of the reference example 1 unless otherwise indicated.

In the second embodiment, the area of the mounting surface of the base plate 6 can be more reduced so that the power supply unit 1 can be shrunk in a direction where the mounting surface is spread. Moreover, the ground line 21 of the secondary coil in the transformer 2 is disposed between the first laminating body 131 and the second laminating body 132, whereby electromagnetic noise occurring at the ground line 21 can be shielded by the first laminating body 131 and the second laminating body 132 as well. In other words, electromagnetic noise from the ground line 21 can be shielded from all directions by the base plate 6, the metal plate 7, the first laminating body 131 and the second laminating body 132 so that electromagnetic noise radiating outside the power supply unit 1 can be effectively reduced.

According to the second embodiment, an arrangement in which the primary semiconductor component 3 and the secondary semiconductor component 4 are disposed at the base plate side. However, at least either the transformer 2 or the choke coil 5 can be disposed at the base plate side.

Third Embodiment

Figure 10:
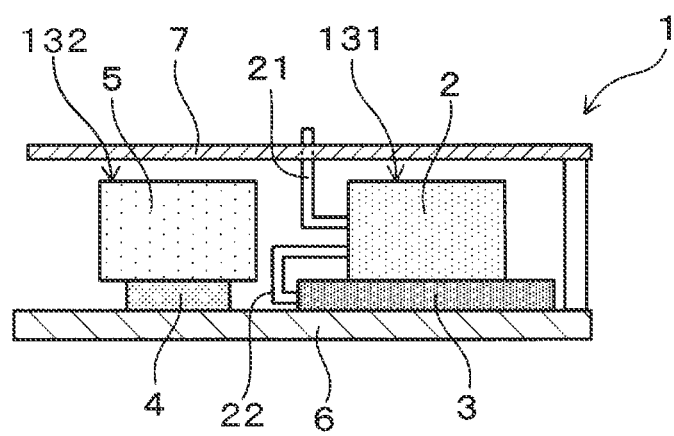
FIG. 10 is an explanatory diagram showing a cross sectional view of the power supply unit according to the third embodiment.

The third embodiment exemplifies a configuration in which the power supply unit according to the second embodiment is modified. As shown in FIG. 10, as shown in FIG. 10, in the power supply unit 1 of the third embodiment, the first laminating body 131 includes a primary semiconductor component 3 laminated in the normal direction of the base plate 6 and a transformer 2. When viewing from the normal direction, the contour of the primary semiconductor component 3 is larger than that of the transformer 2. Also, the primary semiconductor component 3 is disposed on the base plate 6.

The primary semiconductor component 3 and the transformer 2 are electrically connected by a connecting member 22. The connecting member 22 is disposed at a space formed between the first laminating body 131 and the second laminating body 132 so as to connect a side surface of the primary semiconductor component 3 and the side surface of the transformer 2 which are disposed in the first laminating body 131. The transformer 2 is electrically connected to the metal plate 7 via the ground line 21 which is extended from a side surface disposed at a side of the second laminating body 132. At least a part of the connecting member 22 and the ground line 21 is disposed inside the contour of the primary semiconductor component 3, when viewing from the normal direction.

The other configurations in the third embodiment are similar to that of the second embodiment. It is noted that the reference symbols identical to the one used in the second embodiment among the symbols used in the third embodiment or the drawings thereof represents similar elements of the second embodiment unless otherwise indicated.

According to the power supply unit 1 of the third embodiment, the primary semiconductor component 3 and the transformer 2 are laminated so as to form the first laminating body 131. Therefore, space for mounting the primary semiconductor component 3 and the transformer 2 can be shrunk in a direction where the mounting surface of the base plate 6 is spread. Hence, the base plate 6 can be shrunk and further, the power supply unit 1 can be shrunk as well.

Moreover, the ground line 21 is connected to the metal plate 7 at a side of the transformer 2 rather than a side of the primary semiconductor component 3. Therefore, a connecting portion between the ground 21 and the metal plate 7 and the connecting member 22 can be disposed apart from each other. Hence, the metal plate 7 and the ground line 21 can readily be connected without being influenced by the connecting member 22. In the third embodiment, effects and advantages similar to the second embodiment can be obtained.

Fourth Embodiment

Figure 11:
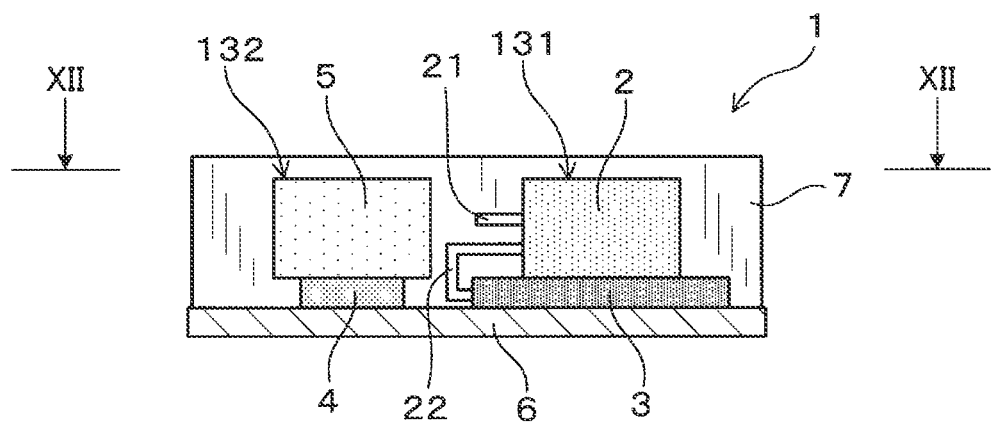
FIG. 11 is an explanatory diagram showing a cross sectional view of the power supply unit according to the fourth embodiment.
Figure 12:
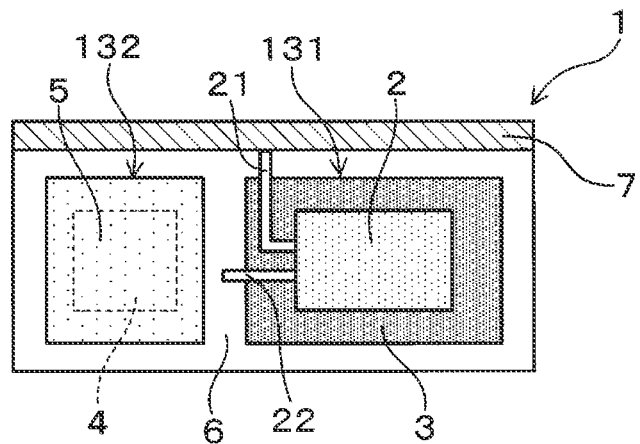
FIG. 12 is a diagram showing a cross sectional view taken along the line XII-XII of FIG. 11.

The fourth embodiment exemplifies a configuration in which a part of the configuration according to the third embodiment is changed. As shown in FIGS. 11 and 12, in the power supply unit 1, the metal plate 7 and the base plate 6 are joined perpendicularly at one end of the base plate 6. The metal plate 7 is disposed on a plane parallel to a direction along which the first laminating body 131 and the second laminating body 132 are arranged.

When viewing from the normal direction, the ground line 21 of the transformer 2 is extended from a side surface of the transformer to the direction along which the first laminating body 131 and the second laminating body 132 are arranged and then, the metal plate 7 is bent towards the metal plate 7. Also, the ground line 21 and the metal plate 7 are electrically connected. The other configurations in the fourth embodiment are similar to that of the third embodiment. It is noted that the reference symbols identical to the one used in the third embodiment among the symbols used in the fourth embodiment or the drawings thereof represents similar elements of the third embodiment unless otherwise indicated.

According to the power supply unit 1 of the fourth embodiment, the base plate 6 and the metal plate 7 are directly joined whereby the configuration of the power supply unit 1 can be simplified. Further, connection point between the ground line 21 of the transformer 2 and the metal plate 7 can be designed flexibly. According to the fourth embodiment, effects and advantages similar to the third embodiment can be obtained.

Fifth Embodiment

The fifth embodiment exemplifies a configuration in which a part of the configuration according to the first embodiment is changed.

Figure 13:
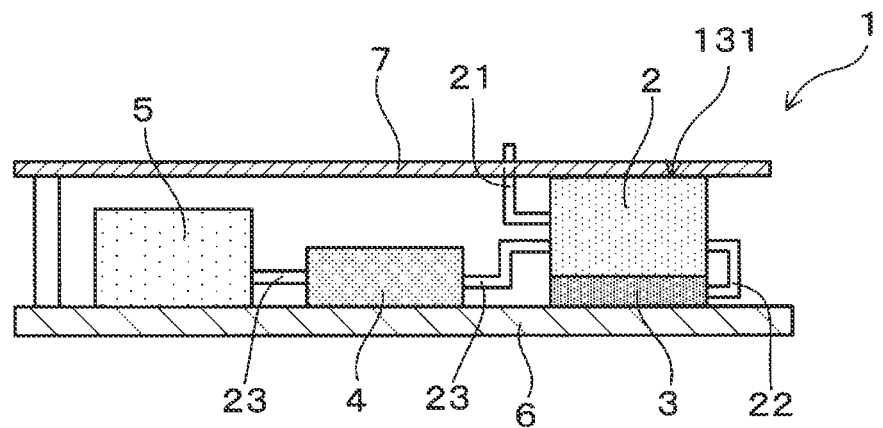
FIG. 13 is an explanatory diagram showing a cross sectional view of the power supply unit according to the fifth embodiment.

As shown in FIG. 13, in the power supply unit 1 of the fifth embodiment, the transformer 2 and the primary semiconductor component 3 are laminated in the normal direction of the base plate 6 to form the first laminating body 31. The laminating body 131 is disposed at base plate side and, the transformer 2 is disposed at the metal plate side. A connecting member 23 connects the transformer 2 and the secondary semiconductor component 4, and also connects the secondary semiconductor component 4 and the choke coil 5. The metal plate 7 and the first laminating body 131 are disposed such that a surface of the metal plate 7 and a surface of the first laminating body 131 which face each other come into contact from each other. The other configurations in the fifth embodiment are similar to that of the first embodiment. It is noted that the reference symbols identical to the one used in the first embodiment among the symbols used in the fifth embodiment or the drawings thereof represents similar elements of the first embodiment unless otherwise indicated.

In the power supply unit 1 of the fifth embodiment, the metal plate 7 contacts with the first laminating body 131, whereby heat produced by the first laminating body 131 can effectively be radiated to the metal plate 7. As a result, the metal plate 7 serves as a cooling unit so as to effectively cool the first laminating body 131. According to the fifth embodiment, effects and advantages similar to the first embodiment can be obtained.

Sixth Embodiment

Figure 14:
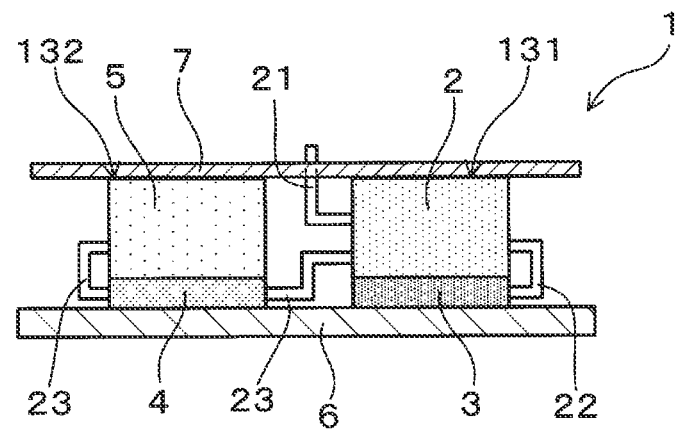
FIG. 14 is an explanatory diagram showing a cross sectional view of the power supply unit according to the sixth embodiment.

The sixth embodiment exemplifies a configuration in which a part of the configuration according to the second embodiment is changed. As shown in FIG. 14, in the power supply unit 1 of the sixth embodiment, the primary semiconductor component 3 and the transformer 2 are laminated in the normal direction of the base plate 6 to form the first laminating body 131 and, the secondary semiconductor component 4 and the choke coil 5 are laminated in the normal direction of the base plate 6 to form the second laminating body 132. The ground line 21 is disposed between the first laminating body 131 and the second laminating body 132.

The first semiconductor component 3 and the transformer 2 are electrically connected by the connecting member 22. The connecting member 22 is disposed to connect a side surface of the primary semiconductor component 3 which is disposed in the first laminating body 131 and a side surface of the transformer 2. Moreover, the connecting member 23 connects the transformer 2 and the secondary semiconductor component 4 and connects the secondary semiconductor component 4 and the choke coil 5.

In the first laminating body 131, the primary semiconductor component 3 is disposed at the base plate side and the transformer 2 is disposed at the metal plate side. Moreover, regarding the second laminating body 132, the secondary semiconductor component 4 is disposed at the base plate side and the choke coil 5 is disposed at the metal plate side. Further, the metal plate, the first laminating body 131 and the second laminating body 132 are disposed such that respective surfaces of the metal plate 7, the first laminating body 131 and the second laminating body which are faced from each other come into contact from each other. The other configurations in the sixth embodiment are similar to that of the second embodiment. It is noted that the reference symbols identical to the one used in the second embodiment among the symbols used in the sixth embodiment or the drawings thereof represents similar elements of the second embodiment unless otherwise indicated.

According to the power supply unit 1 of the sixth embodiment, the metal plate 7 comes into contact with the first laminating body 131 and the second laminating body 132, whereby heat produced by the first laminating body 131 and the second laminating body 132 can be effectively radiated to the metal plate 7. Therefore, the metal plate serves as a cooler so that the first laminating body 31 can effectively cooled. Furthermore, according to the sixth embodiment, effects and advantages similar to the second embodiment can be obtained.

Other than the above-described reference examples and the embodiments, it is considered that various aspects of reference examples or the embodiments can be employed. Also, plural reference examples or embodiments can be combined in the disclosure.

What is claimed is:

1. A power supply unit comprising:
a transformer having a primary coil and a secondary coil;
a primary component that constitutes a primary circuit connected to a primary coil of the transformer;
a secondary component that constitutes a secondary circuit connected to a secondary coil of the transformer;
a choke coil that constitutes a smoothing circuit used to smooth the output voltage thereof;
a base plate provided with the transformer, the primary component, the secondary component and the choke coil on a surface thereof, the base plate being connected to a ground;
a metal plate electrically connected to the base plate; and
a connecting member that electrically connects the primary component and the transformer, wherein
the primary component and the transformer are laminated in a normal direction of the base plate to form a first laminating body, the first laminating body is configured such that the primary component is disposed between the base plate and the transformer;
at least a part of the metal plate is disposed closer to the transformer than to the primary component;
the metal plate and the transformer are electrically connected by a ground line, and a connection point between the ground line that extends in the normal direction and the metal plate is located closer to the transformer than to the primary component.

2. The power supply unit according to claim 1, wherein
a contour of the primary component when viewing from the normal direction is larger than a contour of the transformer; and
at least a part of the ground line is disposed at an inner area of the contour of the primary component, when viewing from the normal direction.

3. The power supply unit according to claim 1, wherein the metal plate is disposed on a plane parallel to a surface of the base plate or disposed on a plane perpendicular to the surface of the base plate.

4. The power supply unit according to claim 2, wherein the metal plate is disposed on a plane parallel to a surface of the base plate or disposed on a plane perpendicular to the surface of the base plate.

5. The power supply unit according to claim 1, wherein the metal plate is disposed at an opposite side of the base plate to pinch the first laminating body between the metal plate and the base plate, the metal plate being in parallel to the base plate and facing the base plate from each other.

6. The power supply unit according to claim 2, wherein the metal plate is disposed at an opposite side of the base plate to pinch the first laminating body between the metal plate and the base plate, the metal plate being in parallel to the base plate and facing the base plate from each other.

7. The power supply unit according to claim 3, wherein the metal plate is disposed at an opposite side of the base plate to pinch the first laminating body between the metal plate and the base plate, the metal plate being in parallel to the base plate and facing the base plate from each other.

8. The power supply unit according to claim 5, wherein the metal plate and the first laminating body are disposed such that a surface of the metal plate and a surface of the first laminating body which face each other come into contact with each other.

9. The power supply unit according to claim 1, wherein the secondary component and the choke coil are laminated in the normal direction to form a second laminating body, and the connecting member is disposed between the first laminating member and the second laminating member.

10. The power supply unit according to claim 1, wherein
the metal plate and the transformer are thermally coupled to each other via the ground line; and
the metal plate and the ground line serves as a heat dissipation member to dissipate heat produced in the transformer.

11. The power supply unit according to claim 1, wherein
the base plate serves as a heat dissipation member to dissipate heat produced by components other than the transformer.

* * * * *